Jan. 7, 1941.   C. W. GILES   2,228,005
RELEASING AND TIGHTENING ELEMENTS
Original Filed July 29, 1936
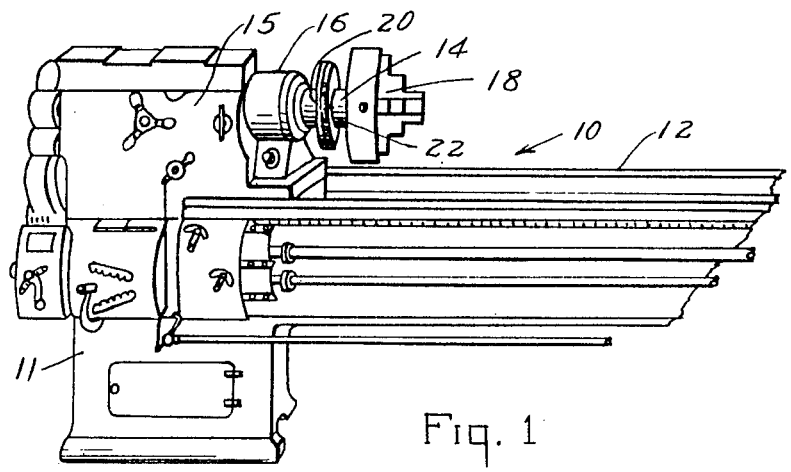
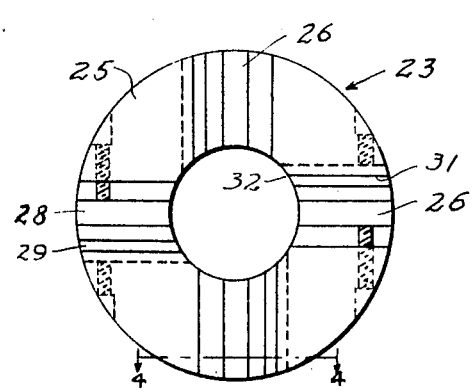
Fig. 2
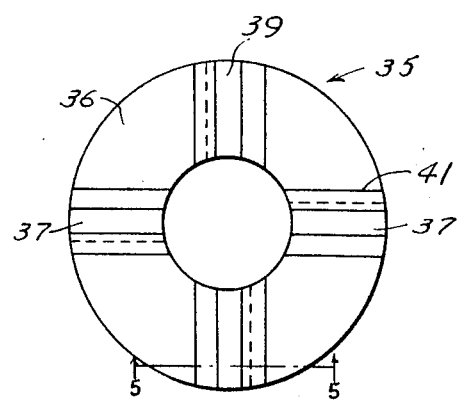
Fig. 3
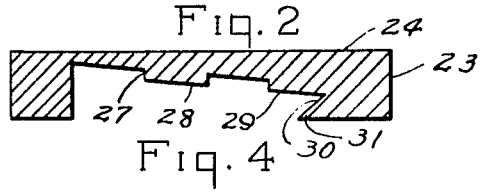
Fig. 4
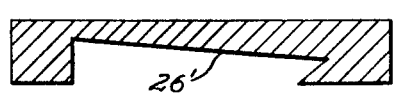
Fig. 6
Fig. 5
Fig. 7
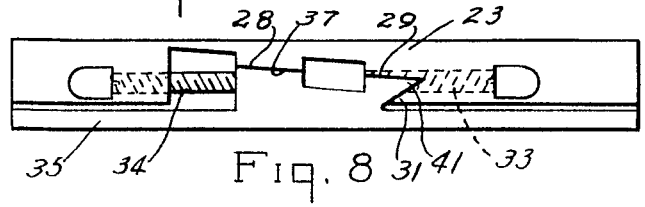
Fig. 8
Inventor
Charles W. Giles Patented Jan. 7, 1941

2,228,005

UNITED STATES PATENT OFFICE 2,228,005

RELEASING AND TIGHTENING ELEMENT

Charles W. Giles, Toledo, Ohio

Application July 29, 1936, Serial No. 93,245
Renewed June 6, 1940

4 Claims. (Cl. 85—50)

This invention relates to releasing elements and more particularly to a fixture for releasing and tightening elements on spindles, shafts, bolts and the like.

An object of the invention resides in the provision of an element of this character capable of being adjusted so as to provide an expanding or contracting action.

A further object of the invention contemplates the use of an adjusting means for such elements operable substantially at right angles to the direction of the expanding or contracting action of the elements.

Another object of the invention resides in the use of a plurality of cooperating wedging elements for releasing fixtures from spindles of lathes and the like.

A still further object is the use of such wedging elements for tightening members on shafts or removing end plates from such shafts.

Further objects and advantages are within the scope of this invention which will be apparent from a consideration of the drawing, and related description of a form of the invention which may be preferred, in which:

Figure 1 is a fragmentary perspective view of a lathe with which the invention has been incorporated;

Figure 2 is a side plan view of one of the wedging elements of the invention.

Figure 3 is a view similar to Figure 2 illustrating another of the wedging elements;

Figure 4 is an enlarged sectional detail view taken substantially on the line 4—4 of Figure 2;

Figure 5 is an enlarged sectional detail view taken substantially on the line 5—5 of Figure 3;

Figure 6 is a view similar to, but illustrating another form of the wedging arrangement shown in Figure 4;

Figure 7 is a view similar to, but illustrating another form of the wedging arrangement shown in Figure 5;

Figure 8 is an end view of the wedging elements in assembled relation.

While a form of the invention has been illustrated as incorporated for use on spindles of lathes, it is to be understood that its use is contemplated wherever the same may be found to have utility, for example, on spindles of other machines as well as on shafts, bolts and the like.

Referring to the drawing, Figure 1 illustrates a portion of a lathe 10 having a base 11 and a bed 12. Suitably positioned with respect to the bed 12 is a spindle 14 driven through suitable gearing (not shown) in a gear box 15. Adjacent one end of the gear box 15 is a casing 16 enclosing one of the bearing members for the spindle 14. An end of the spindle 14 is threaded to removably carry a work supporting fixture such a chuck 18.

In machines of this and similar character, the fixtures are interchangeable in order to support various types of work, and prior to the present invention it has been very difficult to remove such fixtures from the spindle, due to the fact that rotation of the spindle tends to tighten the fixture upon the threaded portion thereof and into engagement with the shoulder of the spindle. To overcome this difficulty, the releasing elements of the present invention are positioned between the shoulder 20 of spindle 14 and a bearing portion 22 of the fixture 18.

The releasing element 23 shown in Figures 2 and 4 is preferably of circular contour having a plane surface 24 and a wedging surface 25. The surface 25 is formed with a plurality of uniformly disposed slots 26 of irregular cross section, the surfaces 27 of which have steps or raised portions 28 and 29, the steps 29 terminating in an undercut portion 30 which provides a locking projection 31. An opening 32 is provided centrally of the element 23 which is adapted to receive the spindle 14. On opposite sides of two or more of the slots 26 are provided threaded openings to receive locking screws 33 and 34 to adjust the plate 23 axially with respect to a cooperating plate or releasing element 35 illustrated in Figure 3.

The releasing element 35 is formed with a wedging surface 36 provided with a plurality of projections 37 of irregular cross section adapted to be received in the corresponding slots 26 of the plate 23. The projections 37 are tapered in a direction opposite to the taper of slots 26 so that when the plates are assembled the tapered surfaces cooperate, as will hereinafter appear. As shown in Figure 5, projections 37 are recessed or slotted as at 39 and undercut as at 40 to provide a locking projection 41. Thus, in assembled relation the undercut portion 30 of plate 23 cooperates with the projection 41 of plate 35 in interlocked relation, the screws 34 serving to secure the plates in such interlocked relation. When the plates are in this position, the tapered projection 37 engages the step portions 28 and 29 of slots 27.

If desired, the slots 26 illustrated in Figures 2 and 4 may be formed as shown at 26' in Figure 6, and the projections 37 shown in Figures 3 and 5 may be formed as at 37' in Figure 7.

In Figure 8 the relation of the contacting surfaces of the plates 23 and 35 has been illustrated, and it will be noted that the relation of the elements is such that the assembled elements occupy the maximum of space or that they are in a position of expansion. Rotation of the plates with respect to each other will reduce the space that the assembled unit occupies to a minimum, and the projections 28 and 29 will drop into the space between the wedging surface 37. Thus, it will be noted that when the assembled unit is applied to the spindle of a lathe in the position shown in Figure 8, the chuck 18 will be separated from the shoulder 20 of the maximum distance provided by the releasing elements, and an abutment for the bearing portion 22 of the chuck 18 is provided. In order to readily release the chuck 18 from the spindle 14, the screws 34 are loosened or backed away from their locking engagement with the projections of the plate 35 and the screws 33 tightened or forced into engagement with the projections 37 to rotate the plates axially and decrease the distance between the outer surface of the releasing members, and thus loosen the chuck 18 from the abutment provided by the plates in their expanded position.

It is to be noted that in addition to serving as a releasing element in the manner above set forth the plates 23 and 35 may be used to perform an opposite action, namely that of an expansion unit. This is accomplished by assembling the plates in contracted relation or position and then tightening the screws 34 which perform a wedging action to spread the outer surfaces of the plates.

It is apparent therefore that in addition to the use of the wedging elements in the manner above described, the same readily lend themselves to various uses and adaptations, and the present disclosure is illustrative merely, the invention comprehending all variations thereof.

What I claim is:

1. In a device of the character described, a pair of plates having inner and outer surfaces, a projection on one of said plates having a tapered surface, a recess in the other of said plates adapted to receive said projection and having a tapered surface cooperating with the tapered surface of said projection, and a screw carried by one of said plates and engageable with an edge of said projection for moving said plates with respect to each other to vary the distance between said outer surfaces.

2. In a device of the character described, a plurality of plates having inner and outer surfaces, a projection on one of said plates having a tapered surface, a recess in another of said plates adapted to receive said projection and having a tapered surface cooperating with the tapered surface of said projection, and means carried by one of said plates for rotating said plates with respect to each other to adjust the distance between said outer surfaces, said means comprising a pair of screws engageable with opposite sides of said projection and cooperating to rotate said plates.

3. In a device of the character described, a plurality of plates having inner and outer surfaces, a projection on one of said plates having a tapered surface, a recess in another of said plates adapted to receive said projection and having a tapered surface cooperating with the tapered surface of said projection, a screw carried by one of said plates and engageable with said projection for locking said plates together, and a screw carried by one of said plates and engageable with said projection for rotating said plates to vary the distance between said outer surfaces when said first screw is disengaged from said projection.

4. In a device of the character described, a plurality of members having inner and outer surfaces, a projection on one of said members having a tapered surface, a recess in another of said members adapted to receive said projection and having a tapered surface cooperating with the tapered surface of said projection, and a plurality of screws carried by one of said members and engageable with opposite sides of said projection for locking and releasing said members.

CHARLES W. GILES.